United States Patent
Lai et al.

(10) Patent No.: US 11,384,282 B1
(45) Date of Patent: Jul. 12, 2022

(54) ONE-COMPONENT TYPE MULTI-FUNCTIONAL FRACTURING FLUID ADDITIVE AND PROCESS FOR PREPARING THE SAME

(71) Applicant: Shaanxi University of Science & Technology, Xi'an (CN)

(72) Inventors: Xiaojuan Lai, Xi'an (CN); Meiling Fan, Xi'an (CN); Lei Wang, Xi'an (CN); Xingen Feng, Xi'an (CN); Weibo Liu, Xi'an (CN); Peng Li, Xi'an (CN); Xiaoxin Zhang, Xi'an (CN)

(73) Assignee: Shaanxi University Of Science & Technology, Xi'an (CN)

( * ) Notice: Subject to any disclaimer, the term of this patent is extended or adjusted under 35 U.S.C. 154(b) by 0 days.

(21) Appl. No.: 17/315,971

(22) Filed: May 10, 2021

(30) Foreign Application Priority Data

Feb. 24, 2021 (CN) .......................... 202110206718.6

(51) Int. Cl.
*C09K 8/68* (2006.01)
*C09K 8/60* (2006.01)
*C09K 8/54* (2006.01)

(52) U.S. Cl.
CPC .................. *C09K 8/68* (2013.01); *C09K 8/54* (2013.01); *C09K 8/602* (2013.01); *C09K 8/605* (2013.01); *C09K 2208/12* (2013.01); *C09K 2208/28* (2013.01); *C09K 2208/32* (2013.01)

(58) Field of Classification Search
CPC . C09K 8/62; C09K 8/68; C09K 8/605; C09K 8/74; C09K 8/76; C09K 8/84; C09K 8/86; C09K 8/88; C09K 8/882; C09K 2208/28; C09K 2208/32
See application file for complete search history.

(56) References Cited

U.S. PATENT DOCUMENTS

2019/0055484 A1* 2/2019 Bartels ................. C08F 222/28

* cited by examiner

Primary Examiner — Aiqun Li
(74) Attorney, Agent, or Firm — Gearhart Law LLC; David Postolski, Esq.

(57) ABSTRACT

The present disclosure discloses a one-component type multi-functional fracturing fluid additive and a process for preparing the same. The process the following steps: mixing ethylene glycol, isopropanol, 1-butanol, 1-hexanol and 1-octanol, and heating to uniformly disperse the mixture to obtain an aqueous dispersant; adding a high molecular polymer thickener and an auxiliary agent to the aqueous dispersant, and stirring the mixture at a high speed to obtain a suspension, wherein the auxiliary agent is one or more selected from clay stabilizers, drainage aids, drag reducers, emulsion inhibitors, filtrate reducers, corrosion inhibitors and fungicides; and slowly stirring the suspension at a low speed, and cooling the suspension to room temperature to collect a sample of suspension. This auxiliary agent has good characteristics such as temperature resistance, shear resistance, salt resistance, and sand suspension.

7 Claims, 2 Drawing Sheets

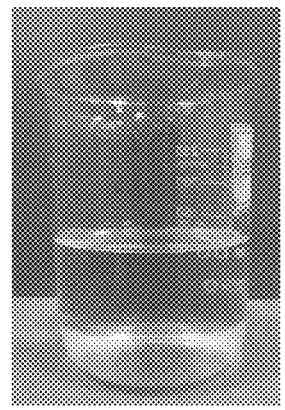 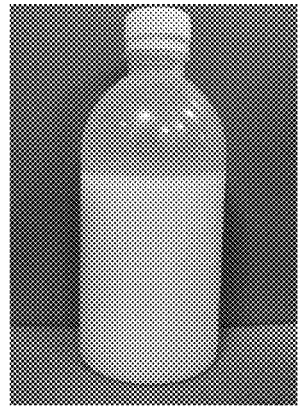
FIG.1  　　FIG.2
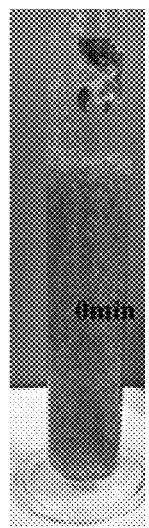 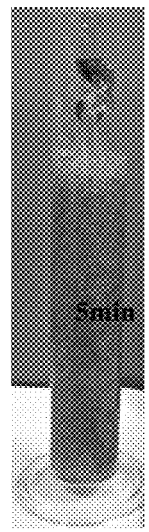 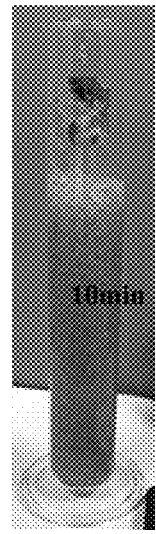
FIG. 3A　　FIG. 3B　　FIG. 3C

ONE-COMPONENT TYPE MULTI-FUNCTIONAL FRACTURING FLUID ADDITIVE AND PROCESS FOR PREPARING THE SAME

CROSS REFERENCE TO RELATED APPLICATION(S)

This patent application claims the benefit and priority of Chinese Patent Application No. 202110206718.6, filed on Feb. 24, 2021, the disclosure of which is incorporated by reference herein in its entirety as part of the present application.

TECHNICAL FIELD

The present disclosure relates to a process for preparing a one-component type multi-functional fracturing fluid additive, and specifically relates to a one-component type multi-functional fracturing fluid additive and a process for preparing the same.

BACKGROUND ART

In recent years, fracturing technology has developed rapidly, and different fracturing systems have been developed and formulated according to different geological conditions to achieve the best fracturing and oil displacement effects.

Taking water-base fracturing systems as example, thickeners guar gum and acrylamide copolymers occupy above 90% of the market of fracturing fluid thickeners due to their advantages of mature construction technology, significant "antipolyelectrolyte effect" and wide pH application range. During the fracturing process, in addition to thickeners, suitable additives, such as clay stabilizers, drainage aids, drag reducers, emulsion inhibitors, filtrate reducers, corrosion inhibitors, fungicides, and the like, are also needed to formulate a fracturing fluid with excellent physical and chemical properties to ensure smooth construction and reduce reservoir damage. Processes for formulating water-base fracturing fluids at construction site mostly involve continuous mixing. When dry powder thickeners are used, there are disadvantages, such as high labor intensity, easy formation of dust, uneven mixing of thickeners, long dissolution time, difficulty in adding additives, etc. In recent years, emulsion-type fracturing fluids and oil dispersion-type fracturing fluids have been developed, but emulsion-type fracturing fluids has a low viscosity retention rate and low content in saline water, and the cost is high; oil dispersion-type fracturing fluids do not meet safety and environmental protection requirements because they contain a large amount of harmful organic solvents and cause serious pollution to formations. How to prepare a multi-functional fracturing fluid additive that meets safety and environmental protection requirements of oil and gas fields and has good performance has become a problem to be solved urgently.

SUMMARY

In order to address problems in the prior art, the present disclosure provides a one-component type multi-functional fracturing fluid additive and a process for preparing the same to overcome the disadvantages that the existing dry powder additives are prone to dust formation, uneven mixing, long dissolution time, difficult preparation of fluids, and the emulsion-type fracturing fluids and oil dispersion-type fracturing fluids cause serious pollution to formations, have poor functionality and involve complex flowback fluid treatment. A multi-functional fracturing fluid additive system is prepared, which is safe, environmentally friendly, temperature-resistant and shear-resistant, and has good performance.

In order to achieve the above objectives, the present disclosure uses the following technical means:

A process for preparing a one-component type multi-functional fracturing fluid additive, comprising the following steps:

Mixing ethylene glycol, isopropanol, 1-butanol, 1-hexanol and 1-octanol, and heating to uniformly disperse the mixture to obtain an aqueous dispersant;

Adding a high molecular polymer thickener and an auxiliary agent to the aqueous dispersant, and stirring the mixture at a high speed to obtain a suspension, wherein the auxiliary agent is one or more selected from clay stabilizers, drainage aids, drag reducers, emulsion inhibitors, filtrate reducers, corrosion inhibitors and fungicides;

Slowly stirring the suspension at a low speed, and cooling the suspension to room temperature to collect a sample of suspension.

As a further improvement of the present disclosure, the ethylene glycol, isopropanol, 1-butanol, 1-hexanol and 1-octanol are added in an amount of 20 to 40% wt, 20 to 40% wt, 1 to 10% wt, 0.1 to 5% wt, 0.1 to 5% wt of the total amount of the suspension.

As a further improvement of the present disclosure, the high molecular polymer thickener is added in an amount of 20 to 50% wt of the total amount of the suspension.

As a further improvement of the present disclosure, the clay stabilizers, drainage aids, drag reducers, emulsion inhibitors, filtrate reducers, corrosion inhibitors and fungicides in the auxiliary agent are added in an amount of 0 to 10% wt, 0 to 10% wt, 0 to 10% wt, 0 to 10% wt, 0 to 10% wt, 0 to 10% wt, 0 to 10% wt of the total amount of the suspension.

As a further improvement of the present disclosure, the high molecular polymer thickener is obtained by pulverizing high molecular polymer solids with a pulverizer and then sieving with an 80 to 140-mesh sieve.

As a further improvement of the present disclosure, the clay stabilizers, drainage aids, drag reducers, emulsion inhibitors, filtrate reducers, corrosion inhibitors and fungicides are obtained by separate grinding and then sieving with an 80 to 140-mesh sieve.

As a further improvement of the present disclosure, the high molecular polymer thickener is selected from hydrophobic acrylamide copolymers.

As a further improvement of the present disclosure, the clay stabilizer is selected from KCl, the drainage aid is selected from nonionic fluorine-containing surfactants, the drag reducer is selected from PVA, the emulsion inhibitor is selected from polyether DY202, and the filtrate reducer is selected from modified starch, the corrosion inhibitor is selected from quinolines, and the fungicide is selected from $CuSO_4$.

As a further improvement of the present disclosure, the high speed is in the range of 5000 to 9000 r/min; the low speed is in the range of 1000 to 4000 r/min.

A one-component type multi-functional fracturing fluid additive, comprising the following raw materials in weight percentage:

Ethylene glycol 20 to 40% wt;
Isopropanol 20 to 40% wt;
1-Butanol 1 to 10% wt;
1-Hexanol 0.1 to 5% wt;

1-Octanol 0.1 to 5% wt;
High molecular polymer thickener 20 to 50% wt;
Clay stabilizer 0 to 10% wt;
Drainage aid 0 to 10% wt;
Drag reducer 0 to 10% wt;
Emulsion inhibitor 0 to 10% wt;
Filtrate reducer 0 to 10% wt;
Corrosion inhibitor 0 to 10% wt;
Fungicide 0 to 10% wt.

Compared with the prior art, the present disclosure has the following advantages:

The present disclosure provides a process for preparing a one-component type multi-functional fracturing fluid additive. The one-component type multi-functional fracturing fluid additive of the present disclosure uses ethylene glycol/isopropanol/1-butanol/1-hexanol/1-octanol as dispersant, and one or more of high molecular polymer thickeners/clay stabilizers/drainage aids/drag reducers/emulsion inhibitors/filtrate reducers/corrosion inhibitors/fungicides as dispersed substance; heated dispersants are mixed with dispersed substances and then subjected to high-speed stirring and low-speed low-temperature stirring to form a suspension of one-component type multi-functional fracturing fluid additive. The suspension is prepared based on the principle that the polymer dispersant in 1-butanol/1-hexanol/1-octanol is wrapped around the surface of solid particles, and then surrounded by the same series of low-molecular dispersants, and thereafter, dispersed in the same series of ethylene glycol/isopropanol aqueous dispersant with even lower molecular weight. According to the principle that similar substances are more likely to be dissolved by each other, the surrounded solid particles and the aqueous dispersant are two phases that are dispersed more uniformly and stably, thereby preparing novel environmentally friendly multi-functional water-dispersion oilfield chemical auxiliaries.

By observing the stability and flow state of the one-component type multi-functional fracturing fluid additive, the amount of dispersant used in the one-component type multi-functional fracturing fluid additive is optimized. The performance of the one-component type multi-functional fracturing fluid additive has been tested, and the results show that this auxiliary agent has good characteristics such as temperature resistance, shear resistance, salt resistance, and sand suspension. It solves the problems that the existing fracturing fluid systems cause serious pollution to the formation, are difficult to dissolve, and have limited function and poor performance, etc., and exhibits good use performance, environmental protection, and energy saving and consumption reduction characteristics, which can be used for the development of clean and environmentally friendly one-component type multi-functional fracturing fluid additives.

BRIEF DESCRIPTION OF THE DRAWINGS

FIG. 1 is a photo showing a sample of the suspension;
FIG. 2 is a photo showing a sample of 1% aqueous solution;
FIGS. 3A, 3B and 3C are photos showing sand suspension in 1% aqueous solution at 0 minute, 5 minutes, and 10 minutes.

DETAILED DESCRIPTION OF THE EMBODIMENTS

Figure 4:
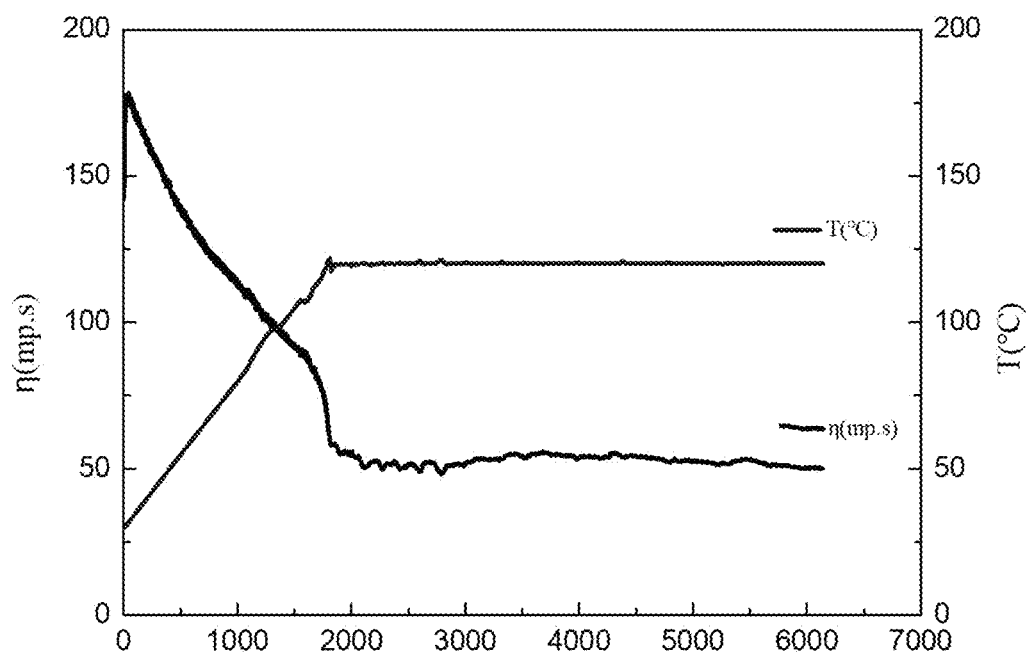
FIG. 4 is a rheological diagram of 1% aqueous solution.

The present disclosure provides a process for preparing a one-component type multi-functional fracturing fluid additive. According to the actual needs of the site, the present disclosure uses ethylene glycol, isopropanol, 1-butanol, 1-hexanol, and 1-octanol as dispersant, and one or more of high molecular polymer thickener (hydrophobic acrylamide copolymer), clay stabilizer (KCl), drainage aid (nonionic fluorine-containing surfactant), drag reducer (PVA), emulsion inhibitor (polyether DY202), filtrate reducer (modified starch), corrosion inhibitor (quinoline), and fungicide ($CuSO_4$) as dispersed substance.

The specific preparation process is as follows:

1) A high molecular polymer thickener is pulverized with a multi-functional electric pulverizer and removed from the pulverizer. The pulverized high molecular polymer thickener is "sieved" with a 80 to 140-mesh sieve; the sieved high molecular polymer is collected and sealed for storage;

2) Solid samples of clay stabilizers, drainage aids, drag reducers, emulsion inhibitors, filtrate reducers, corrosion inhibitors and fungicides are ground and "sieved" with a 80 to 140-mesh; the sieved materials are collected and sealed for storage;

3) Aqueous dispersant ethylene glycol, isopropanol, 1-butanol, 1-hexanol and 1-octanol are added to a beaker, heated on a thermostatic magnetic stirrer to 60 to 90° C., and continuously stirred for 2 to 6 minutes to evenly disperse the dispersant;

4) One or more of high molecular polymer thickeners, clay stabilizers, drainage aids, drag reducers, anti-emulsifiers, fluid loss agents, corrosion inhibitor and fungicides are added to the aqueous dispersant, evenly stirred with a stir bar, filled in a sample tank of a digital display high-speed mixer, and stirred at a high speed of 5000 to 9000 r/min for 3 to 6 minutes;

5) The speed of the digital display high-speed mixer is adjusted to 1000 to 4000 r/min to slowly stir the suspension, which is then cooled by a water bath with a water temperature of 20 to 25° C.; when the temperature of the suspension drops to room temperature, a sample of the suspension is collected and sealed for storage;

Among these, the dispersants of the one-component type multi-functional fracturing fluid additive are ethylene glycol, isopropanol, 1-butanol, 1-hexanol and 1-octanol, which are added in an amount of 20 to 40% wt, 20 to 40% wt, 1 to 10% wt, 0.1 to 5% wt, 0.1 to 5% wt of the suspension; among these, the dispersed substances are high molecular polymer thickeners, clay stabilizers, drainage aids, drag reducers, emulsion inhibitors, filtrate reducers, corrosion inhibitors and fungicides, which are added in an amount of 20 to 50% wt, 0 to 10% wt, 0 to 10% wt, 0 to 10% wt, 0 to 10% wt, 0 to 10% wt, 0 to 10% wt, 0 to 10% wt of the suspension.

Among these, the one-component type multi-functional fracturing fluid additive is an aqueous additive with a simple formula and multiple effects. The switch of different functions can be achieved by adjusting the type and amount of the dispersed substance. It can be pumped in real time and continuously mixed, which meet the requirements of large displacement constructions. Recovery is simple, and reusability is high. The formulation of flowback fluid does not affect the drag reduction and sand-carrying performance of the system. The prepared additive is free of hydrocarbons, causes less pollution to formations, and has low costs.

Example 1

Preparation of one-component multi-functional fracturing fluid additive (1) A high molecular polymer thickener (hydrophobic acrylamide copolymer) is pulverized with a multi-functional electric pulverizer and "sieved" with a 140-mesh sieve; the sieved high molecular polymer is collected and sealed for storage;

(2) Clay stabilizer (KCl), filtrate reducer (modified starch) and fungicide ($CuSO_4$) are ground and "sieved" with a 140-mesh sieve; the sieved materials are collected and sealed for storage;

(3) 42 g of ethylene glycol, 55 g of isopropanol, 2 g of 1-butanol, 0.8 g of 1-hexanol and 0.4 g of 1-octanol are added to a beaker, heated on a thermostatic magnetic stirrer to 70° C., and continuously stirred for 3 minutes to evenly disperse the dispersant;

(4) Sieved samples of 72 g of hydrophobic acrylamide copolymer, 1 g of potassium chloride, 0.5 g of nonionic fluorine-containing surfactant, 1 g of modified starch, and 2 g of copper sulfate are added to the aqueous dispersant, evenly stirred with a stir bar, filled in a sample tank of a high-speed mixer, and stirred at a high speed of 8000 r/min for 4 minutes;

(5) The speed of the high-speed mixer is adjusted to 4000 r/min to slowly stir the suspension, which is then cooled by a water bath with a water temperature of 20 to 25° C.; when the temperature of the suspension drops to room temperature, a sample of the suspension is collected to obtain an one-component multi-functional fracturing fluid additive, as shown in FIG. 1.

2 mL of the suspension is added to 200 mL of distilled water under the condition of stirring on a thermostatic magnetic stirrer to prepare a 1% aqueous solution, as shown in FIG. 2. The sample is clear and transparent, has no solvent oil, and meets the environmental protection requirements of oilfields;

Example 2

Preparation of one-component multi-functional fracturing fluid additive (1) A high molecular polymer thickener (hydrophobic acrylamide copolymer) is pulverized with a multi-functional electric pulverizer and "sieved" with a 140-mesh sieve; the sieved high molecular polymer is collected and sealed for storage;

(2) 42 g of ethylene glycol, 55 g of isopropanol, 2 g of 1-butanol, 0.8 g of 1-hexanol and 0.4 g of 1-octanol are added to a beaker, heated on a thermostatic magnetic stirrer to 70° C., and continuously stirred for 3 minutes to evenly disperse the dispersant;

(3) A sieved sample of 75 g of hydrophobic acrylamide copolymer is added to the aqueous dispersant, evenly stirred with a stir bar, filled in a sample tank of a high-speed mixer, and stirred at a high speed of 8000 r/min for 4 minutes;

(5) The speed of the high-speed mixer is adjusted to 4000 r/min to slowly stir the suspension, which is then cooled by a water bath with a water temperature of 20 to 25° C.; when the temperature of the suspension drops to room temperature, a sample of the suspension is collected to obtain an one-component multi-functional fracturing fluid additive, as shown in FIG. 3.

Sand suspension performance test of the one-component multi-functional fracturing fluid additive 2 mL of the suspension is added to 200 mL of distilled water under the condition of stirring on a thermostatic magnetic stirrer to prepare a 1% aqueous solution. 100 mL of the aqueous solution is used; 30 g of 20 to 40-mesh quartz sands are added, evenly stirred and poured into a measuring cylinder, and the timer is started, as shown in FIG. 3.

It can be seen from the figure that the quartz sands do not fall off after the aqueous solution is allowed to stand still for 5 minutes and 10 minutes, and the sand suspension performance is good.

Example 3

Preparation of one-component multi-functional fracturing fluid additive (1) A high molecular polymer thickener (hydrophobic acrylamide copolymer) is pulverized with a multi-functional electric pulverizer and "sieved" with a 140-mesh sieve; the sieved high molecular polymer is collected and sealed for storage;

(2) Clay stabilizer (KCl) is ground and "sieved" with a 140-mesh sieve; the sieved materials are collected and sealed for storage;

(3) 43 g of ethylene glycol, 56 g of isopropanol, 2 g of 1-butanol, 0.8 g of 1-hexanol and 0.4 g of 1-octanol are added to a beaker, heated on a thermostatic magnetic stirrer to 70° C., and continuously stirred for 3 minutes to evenly disperse the dispersant;

(4) Sieved samples of 71 g of hydrophobic acrylamide copolymer and 4 g of potassium chloride are added to the aqueous dispersant, evenly stirred with a stir bar, filled in a sample tank of a high-speed mixer, and stirred at a high speed of 8000 r/min for 4 minutes;

(5) The speed of the high-speed mixer is adjusted to 4000 r/min to slowly stir the suspension, which is then cooled by a water bath with a water temperature of 20 to 25° C.; when the temperature of the suspension drops to room temperature, a sample of the suspension is collected to obtain an one-component multi-functional fracturing fluid additive.

Salt resistance test of the one-component multi-functional fracturing fluid additive After dissolving 58.5 g of NaCl, 5.5 g of $CaCl_2$, 4.5 g of $MgCl_2$ and 20 g of KCl in 500 mL of distilled water, the mixture is added to a 1 L volumetric flask with a set volume to prepare 80,000 standard mineralized water; the mineralized water is diluted in 0, 10%, 30%, 50%; 200 mL of each is formulated together with the suspension in Example 1 to form 0.6%, 0.7%, 0.8%, 0.9%, 1.0% aqueous solution; the viscosity of each sample is measured, and the specific data are shown in Table 1.

TABLE 1

Viscosity of samples under different salinities
Viscosity of samples (mPa · s)

| | Concentration of samples | | | | |
|---|---|---|---|---|---|
| | 0.6% | 0.7% | 0.8% | 0.9% | 1% |
| In clear water | 84 | 102 | 126 | 153 | 180 |
| In 10% standard saline water | 72 | 90 | 117 | 135 | 171 |
| In 30% standard saline water | 57 | 84 | 99 | 117 | 150 |
| In 50% standard saline water | 54 | 69 | 81 | 99 | 120 |

TABLE 1-continued

Viscosity of samples under different salinities
Viscosity of samples (mPa · s)

Concentration of samples

| | 0.6% | 0.7% | 0.8% | 0.9% | 1% |
|---|---|---|---|---|---|
| Viscosity retention rate of samples in saline water | 85.7%/ 67.9%/ 64.3% | 88.2%/ 82.3%/ 67.6% | 92.8%/ 78.6%/ 64.3% | 88.2%/ 76.5%/ 64.7% | 95%/ 83.33%/ 66.7% |

It can be seen from Table 1 that the one-component multi-functional fracturing fluid additive has good salt resistance and high viscosity retention rate in saline water. In an aqueous solution of 50% standard salt, the viscosity retention rate reaches above 60%.

Anti-swelling test of the one-component multi-functional fracturing fluid additive 1.0% of a 10% standard saline solution is placed over 0.08% of ammonium persulfate in a 90° C. water bath for 2 hours to break the gel, and tested with a NP-01 intelligent shale swell meter. The anti-swelling rate of the gel-breaking fluid is greater than 85%, which can effectively prevent clay minerals from swelling and migration during application.

Example 4

Preparation of one-component multi-functional fracturing fluid additive (1) A high molecular polymer thickener (hydrophobic acrylamide copolymer) is pulverized with a multi-functional electric pulverizer and "sieved" with a 120-mesh sieve; the sieved high molecular polymer is collected and sealed for storage;

(2) Drag reducer (PVA) is ground and "sieved" with a 120-mesh sieve; the sieved materials are collected and sealed for storage;

(3) 44 g of ethylene glycol, 56 g of isopropanol, 3 g of 1-butanol, 0.8 g of 1-hexanol and 0.4 g of 1-octanol are added to a beaker, heated on a thermostatic magnetic stirrer to 70° C., and continuously stirred for 4 minutes to evenly disperse the dispersant;

(4) Sieved samples of 71 g of hydrophobic acrylamide copolymer and 3 g of drag reducer (PVA) are added to the aqueous dispersant, followed by the addition of 4 g of drainage aid (fluorocarbon surfactant) and 5 g of corrosion inhibitor (quinoline HC-HS2), evenly stirred with a stir bar, filled in a sample tank of a high-speed mixer, and stirred at a high speed of 8000 r/min for 4 minutes;

(5) The speed of the high-speed mixer is adjusted to 5000 r/min to slowly stir the suspension, which is then cooled by a water bath with a water temperature of 20 to 25° C.; when the temperature of the suspension drops to room temperature, a sample of the suspension is collected to obtain an one-component multi-functional fracturing fluid additive.

Temperature resistance and shear resistance test of the one-component multi-functional fracturing fluid additive 2 mL of the suspension is added to 200 mL of distilled water under the condition of stirring on a thermostatic magnetic stirrer to prepare a 1% aqueous solution. 50 mL of the 1% aqueous solution is subjected to a temperature resistance and shear resistance test using HAAKE MARS rheometer at 170 s$^{-1}$ shear rate and 120° C., as shown in FIG. 4.

It can be seen from FIG. 4 that the one-component multi-functional fracturing fluid additive has good temperature resistance and shear resistance. When the 1% aqueous solution is sheared at 120° C. for 1 hour, the viscosity remains at about 50 mPa·s.

Drag reduction performance test of the one-component multi-functional fracturing fluid additive The one-component multi-functional fracturing fluid additive is used to prepare 500 g of 0.04% slick water, and the drag reduction rate is 73.4%, as measured by friction meter from China Haian Petroleum Scientific Instruments Co., Ltd., and the drag reduction performance is good.

[91] Although the specific examples of the present disclosure are described and illustrated in detail hereinabove, it should be indicated that various changes and modifications can be made to the above examples, while these do not depart from the scope of claims appended to the present disclosure.

What is claimed is:

1. A process for preparing a one-component type multi-functional fracturing fluid additive, comprising the following steps:
   mixing ethylene glycol, isopropanol, 1-butanol, 1-hexanol and 1-octanol, and heating to uniformly disperse the mixture to obtain a dispersant;
   adding a hydrophobic acrylamide copolymer thickener and an auxiliary agent to the dispersant, and stirring the mixture at a high speed to obtain a suspension, wherein the auxiliary agent is one or more selected from the group consisting of clay stabilizers, drainage aids, drag reducers, emulsion inhibitors, filtrate reducers, corrosion inhibitors and fungicides;
   slowly stirring the suspension at a low speed, and cooling the suspension to room temperature to collect a sample of suspension,
   wherein the hydrophobic acrylamide copolymer thickener is obtained by pulverizing hydrophobic acrylamide copolymer solids with a pulverizer and then sieving with an 80 to 140-mesh sieve.

2. The process for preparing a one-component type multi-functional fracturing fluid additive according to claim 1, wherein the ethylene glycol, isopropanol, 1-butanol, 1-hexanol and 1-octanol are added in an amount of 20 to 40 wt %, 20 to 40 wt. %, 1 to 10 wt %, 0.1 to 5 wt %, 0.1 to 5 wt % of the total amount of the suspension, respectively.

3. The process for preparing a one-component type multi-functional fracturing fluid additive according to claim 1, wherein the hydrophobic acrylamide copolymer thickener is added in an amount of 20 to 50 wt % of the total amount of the suspension.

4. The process for preparing a one-component type multi-functional fracturing fluid additive according to claim 1, wherein the clay stabilizers, drainage aids, drag reducers, emulsion inhibitors, filtrate reducers, corrosion inhibitors and fungicides in the auxiliary agent are added in an amount of 0 to 10 wt %, 0 to 10 wt %, 0 to 10 wt %, 0 to 10 wt %, 0 to 10 wt %, 0 to 10 wt %, 0 to 10 wt %, of the total amount of the suspension, respectively.

5. The process for preparing a one-component type multi-functional fracturing fluid additive according to claim 1, wherein the clay stabilizers, drainage aids, drag reducers, emulsion inhibitors, filtrate reducers, corrosion inhibitors and fungicides are obtained by separate grinding and then sieving with an 80 to 140-mesh sieve.

6. The process for preparing a one-component type multi-functional fracturing fluid additive according to claim 1, wherein the clay stabilizer is selected from KCl, the drainage aid is selected from nonionic fluorine-containing surfactants, the drag reducer is selected from polyvinyl alcohol, the filtrate reducer is selected from modified starch, the corrosion inhibitor is selected from quinolines, and the fungicide is selected from $CuSO_4$.

7. The process for preparing a one-component type multi-functional fracturing fluid additive according to claim 1, wherein the high speed is in the range of 5000 to 9000 r/min; the low speed is in the range of 1000 to 4000 r/min.

* * * * *